United States Patent Office 3,159,729
Patented Dec. 1, 1964

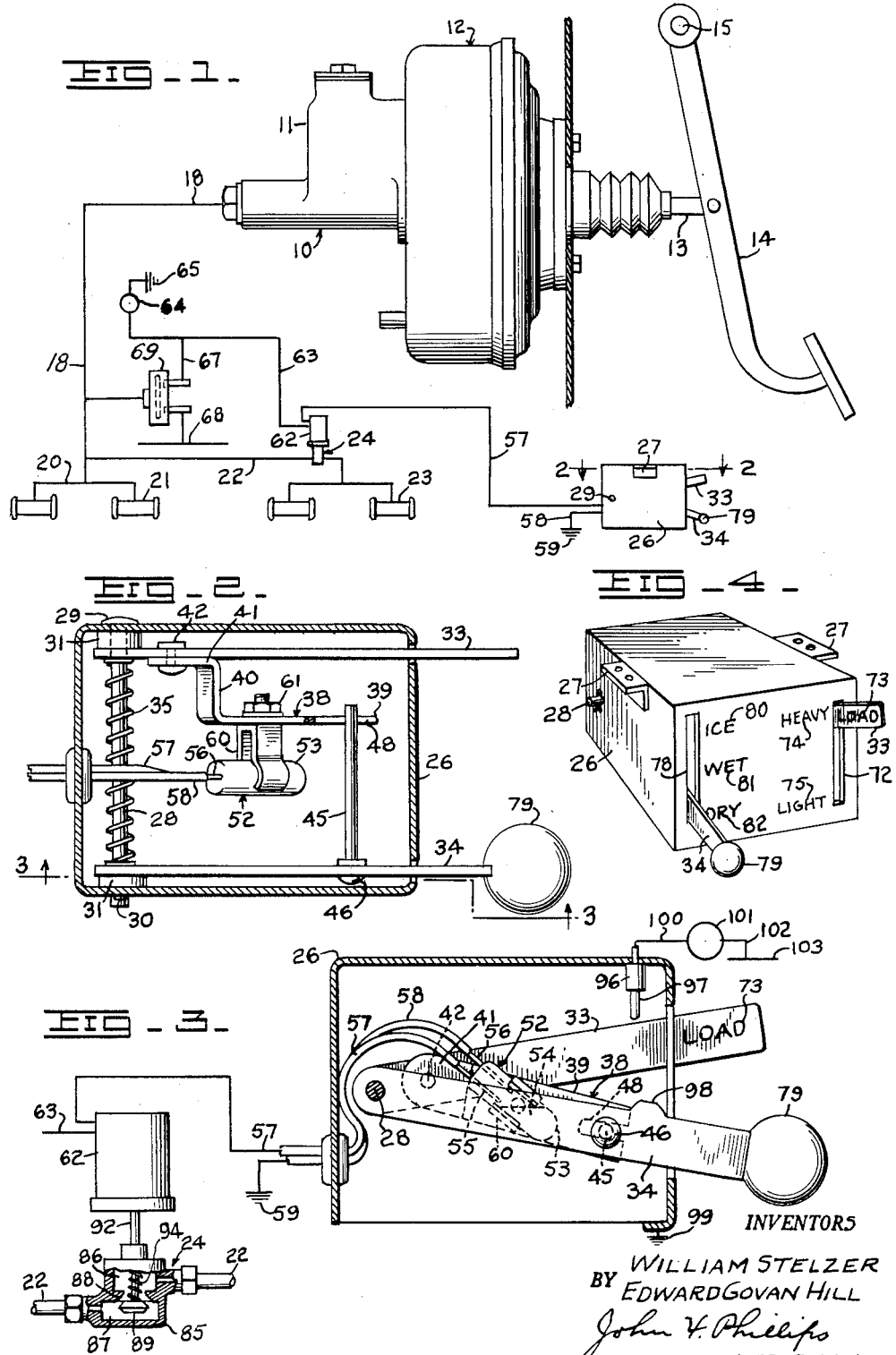

3,159,729
MOTOR VEHICLE BRAKE SYSTEM
William Stelzer, Bloomfield Hills, and Edward Govan Hill, Birmingham, Mich., assignors to Kelsey-Hayes Company, Romulus, Mich., a corporation of Delaware
Filed July 12, 1961, Ser. No. 123,551
10 Claims. (Cl. 200—61.47)

The invention relates to a motor vehicle brake system and, particularly, to a system having automatic means for limiting the application of the rear brakes according to road or vehicle load conditions.

It has been proposed to provide means for limiting the application of the rear brakes of a motor vehicle to prevent or minimize the locking or sliding of the rear wheels. When such locking of the rear wheels occurs, effective braking is lost and the vehicle tends to skid. Some prior constructions employ inertia operated ball valves adapted to stop the admission of brake fluid to the rear wheel cylinders when the rate of vehicle deceleration reaches a predetermined point. Other devices of this general nature operate to prevent or limit energization of a fluid pressure motor to limit the generation of pressure in the rear wheel cylinders.

Some mechanisms have been developed to provide for the manual controlling of maximum rear brake application according to different load conditions and when the highways are slippery. Still other systems, employing the inertia means of the general type referred to, have been employed in conjunction with brake systems employing master and slave motors, wherein the slave motor applies the rear vehicle brakes and is energized by pressure supplied through a pipeline connected to the master motor. The inertia control valves are arranged in such pipeline.

An important object in the present invention is to provide a novel motor vehicle brake system, wherein the maximum rear brake operating hydraulic pressure may be limited in a simple brake system which need not employ a slave motor and wherein the valve employed for limiting rear wheel pressure becomes inoperative immediately when the need for its operation has ceased.

A further object is to provide a system of this character wherein a valve for controlling maximum rear brake application is subject to control variably in accordance with both road and vehicle load conditions.

A further object is to provide such a system having manual controls respectively settable in accordance with road surface and vehicle load conditions, wherein the manual controls cooperate in such a manner that, for given road conditions, the automatic vehicle brake limiting means will come into operation at a predetermined rate of vehicle deceleration according to the setting of the load control means, and wherein the automatic valve under the same load conditions will operate at a lower predetermined rate of vehicle deceleration, if the control which is operative according to road surface conditions, is set for wet, slippery or icy conditions.

A further object is to provide such a mechanism wherein the automatic valve is solenoid-operated and is controlled by a tiltable mercury switch, and wherein such switch is connected between and operative in accordance with the setting of separate but cooperative manual controls for road surface and vehicle load conditions.

Other objects and advantages of the invention will become apparent during the course of the following description.

In the drawings I have shown one embodiment of the invention. In this showing:

FIGURE 1 is a side elevation of a brake operating motor, the system embodying the present invention being diagrammatically shown, FIGURE 2 is an enlarged sectional view on line 2—2 for FIGURE 1, FIGURE 3 is a vertical sectional view on line 3—3 of FIGURE 2 showing a pressure controlled valve in one of the brake lines, and showing diagrammatically the means connected to the device for operating such valve, and FIGURE 4 is a perspective view of the casing for housing the control means of the present invention.

Referring to FIGURE 1 the numeral 10 designates a brake master cylinder having the usual reservoir 11 for replenishing fluid in the master cylinder. The present invention may be operated by a conventional brake pedal but is particularly adapted for use with a power operated brake-applying mechanism such as a booster motor. Such motor is indicated as a whole by the numeral 12 and may be of any conventional type having a piston or other pressure movable unit (not shown) connected to the conventional plunger of the master cylinder. Such a motor conventionally employs a follow-up control valve mechanism (not shown) operative by a rod 13 connected to a brake pedal 14, preferably of the depending type, pivoted at its upper end as at 15. The motor 12 is secured in any suitable manner to the fire wall 16.

As will become apparent, the fluid displacing mechanism comprising the motor 12 and master cylinder 10 is of the type wherein a single hydraulic line 18 supplies hydraulic fluid under pressure to all of the vehicle wheel cylinders. It will become apparent, however, that the present invention is applicable for use with other systems, for example, truck braking systems employing master and slave motors, each having its own master cylinder from which fluid will be displaced respectively to the front and rear wheel cylinders.

In the present instance, the fluid line 18 is shown as being connected as at 20 to the front wheel cylinders 21. A line 22 passes fluid from the line 18 to the rear wheel cylinders 23, and an auxiliary valve 24, further described below, is arranged in the line 22. The present device primarily comprises means for closing the valve 24 when the rate of vehicle deceleration increases to a predetermined point to prevent the locking and sliding of the rear vehicle wheels, or at least to minimize such action.

The means for controlling the valve 24 comprises a casing 26 having attaching brackets 27 for fixing the device in position, for example, beneath the instrument panel of the vehicle. Within the left or forward end of the casing 26 (FIGURES 2 and 3) is arranged a transverse horizontal shaft 28 which may be in the form of a simple rod having a head 29 lying against one outer sidewall of the casing 26 with the other end of the rod projecting through the other sidewall and maintained in position by a cotter pin 30. Arranged against each casing sidewall and surrounding the shaft 28 is a friction washer 31, preferably formed of fibre, for a purpose to be described.

Two levers 33 and 34 are pivoted on the shaft 28 as shown in FIGURE 2. A spring 35 surrounds the shaft 28 and maintains the levers 33 and 34 in frictional engagement with the respective washers 31 so that when either lever is moved to a selected position, it will remain in such position.

An idler lever 38 has one end 39 spaced from and parallel to both levers. The lever 38 is bent transversely as at 40 and has its other end 41 pivotally connected as at 42 to the lever 33. A horizontal transversely extending rod 45 is connected at one end to the lever 34, preferably by riveting as at 46. The other end of the rod 45 engages within a longitudinal slot 48 formed in the lever end 39. It will become apparent that movement of the lever 33 moves the pivot 42 to cause the lever 38 to pivot on the rod 45. Conversely, movement of the lever 34, acting through the rod 45 causes the lever 38 to pivot on the rivet 42.

A mercury switch 52 is adapted to be controlled by the levers 33 and 34. This switch conventionally comprises a glass tube 53 having a body of mercury 54 (FIGURE 3) therein. The tube 53 is inclined upwardly and forwardly of the vehicle and upon an increase in the rate of vehicle deceleration to a predetermined point depending on the adjustment of the levers 33 and 34, the body of mercury is adapted to flow upwardly and forwardly to close a circuit through a pair of contacts 55 and 56, connected respectively to wires 57 and 58, the latter of which is grounded as at 59. A clip 60 connects the tube 53 to the lever 38 through a bolt, the nut 61 of which may be loosened for adjusting the angle of the tube 53.

The wire 57 is connected to one terminal of a solenoid 62. The other terminal of this solenoid is connected by wire 63 to a vehicle stoplight 64 (FIGURE 1), grounded as at 65. The wire 63 is connected by a wire 67 to one side of a conventional 12 volt line 68, and a conventional stoplight switch 69 is interposed in the wire 67.

The lever 33 projects from the front wall of the casing 26 through a vertical slot 72 and preferably bears on one side thereof the legend "load" as at 73 (FIGURE 4). The front wall of the casing preferably bears the legends "heavy" as indicated at 74 and "light" as at 75. It will become apparent that the lever 33 is moved downwardly when the system is to be set for a light vehicle load or upwardly for a heavier vehicle load.

The lever 34 projects from the front wall of the casing 36 through a vertical slot 78 and is preferably provided at its free end with a knob 79. The face of the casing 26 adjacent the slot 78 is provided with the three legends "ice" as at 80, "wet" as at 81, and "dry" as at 82. The two levers 33 and 34 are operated in accordance with load and highway surface conditions to determine if and when the hydraulic line 22 will be closed by the valve 24. Referring to FIGURE 3, it will be noted that the valve 24 comprises a body 85 having upper and lower chambers 86 and 87 provided therebetween with a valve seat 88 engageable by a normally open valve 89 to close communication through the line 22. The valve 89 is carried by an upwardly extending stem 92, the upper end of which forms the armature for the solenoid 62. The valve 89 is biased to open position by a spring 94.

A push button switch 96 is fixed to the casing 26 and has a depending stem 97 in the vertical plane of the lever 34 to be engaged by a boss 98 on such lever when the latter is in its uppermost position. The switch 96 is grounded on the casing 26, which, in turn, is grounded as at 99. A wire 100 is connected between the switch 96 and one terminal of a signal light 101, the other terminal of this signal being connected as at 102 to a source wire 103 corresponding to or forming a part of the wire 68.

*Operation*

The brake pedal 14 is operated in the usual manner to control the follow-up valve mechanism (not shown) to thus energize the motor 12 and displace fluid under pressure into the line 18. Hydraulic pressure thus will be supplied to all of the wheel cylinders through the lines 20 and 22, the valve 89 (FIGURE 3) being normally open. The operation of the brake pedal causes the stoplight switch 69 to operate the stoplight 64, but no current will be supplied to the solenoid 62 unless and until the mercury switch 52 is operated, as described below.

It will be noted in FIGURES 3 and 4 that the lever 33 is in its uppermost position, which position is occupied under maximum vehicle load conditions. At the same time the lever 34 is in its lowermost position, and this position is the desired position when the road surface is dry, there being present therefore maximum traction between the vehicle wheels and the highway. The vehicle brakes, therefore, are capable of maximum energization, and in this position of the levers, the pivot 42 will be in its uppermost position and the rod 45 in its lowermost position, and under such conditions the mercury tube 53 will occupy a position at a maximum angle to the horizontal.

Assuming that the brake pedal is depressed with substantial force to provide a maximum rate of vehicle deceleration, such rate may be higher than the rear wheels of the vehicle are able to withstand without locking and sliding. The system is so designed that just prior to the point where the rear wheels will lock and slide, the inertia of a body of mercury in the switch 52 will cause such body to move upwardly and forwardly to engage both contacts 55 and 56.

At this point the circuit will be completed from wire 68 (FIGURE 1) through the switch 69, which will have been closed, then through wires 67 and 63 and through the solenoid 62, thence through wire 57, through the mercury switch 52 and to the ground 59. The solenoid 62 thus will be energized and the valve 89 will be moved upwardly to closed position against the loading of the spring 94. Accordingly there can be no further increase in the hydraulic pressure transmitted to the rear wheel cylinders 23 and accordingly the rear wheel brakes will not be applied to such an extent as to cause the rear vehicle wheels to lock and slide. Traction thus will be maintained between the rear wheels and the highway to provide maximum rear wheel braking. The front wheel cylinders, of course, can accept progressively higher pressures to the maximum extent, and thus maximum braking for the vehicle as a whole will be provided.

Assuming that the vehicle is loaded to a medium extent, the lever 33 will be moved downwardly to a proper point intermediate the ends of the slot 72. From FIGURE 3 it will be apparent that such operation moves the pivot 42 downwardly and the turning of the lever 38 about the axis of the rod 45 decreases the angle of the mercury switch 52 to the horizontal. With such medium loading of the vehicle it will be obvious that the rear wheel cylinders can accept lower maximum hydraulic pressure before the rear wheels will lock. The decrease in the inclination to the horizontal of the mercury switch lowers the rate of vehicle deceleration at which the mercury switch will close, and thus limiting the pressure to which the rear wheel cylinders 23 are subjected. Again the rear wheel will be prevented from locking. Obviously a still lower rate of vehicle deceleration will close the mercury switch if the vehicle is traveling light and the lever 33 is arranged at the bottom of the slot 72. The lever 33 is set in such position when only the front seat of the vehicle, in the case of a passenger car, is occupied. It will be obvious, therefore, that for any different load conditions, whether the vehicle is a passenger car or truck, the lever 33 can be set in a proper position to prevent the locking of the rear wheels.

It is well known that the traction of vehicle wheels varies according to road conditions. When the highway is dry, the lever 34 is set at its lowermost position, thus correspondingly positioning the rod 45 to secure the maximum inclination of the mercury tube 53 for any given position of the pivot 42 as determined by the positioning of the lever 33. As stated, the positions of the levers in FIGURES 3 and 4 are for maximum loads and dry highway conditions. If the road is wet the lever 34 will be moved upwardly to the position indicated by the legend 81. This raises the rod 45 and decreases the angle of the mercury tube 53 to the horizontal. Under such conditions, the circuit through the solenoid will be closed at a lower vehicle deceleration rate than with the levers in the positions shown in FIGURES 3 and 4.

Even on wet roads, the rear wheels will accept greater braking pressure when the vehicle is heavily loaded than when it is running relatively lightly loaded. If the vehicle is loaded only to a medium extent and the road is wet, both levers will be moved to intermediate points, thus further reducing the angle of the mercury tube 53 to the horizontal. If the highway is wet and the vehicle is relatively lightly loaded, the lever 34 will be left in the intermediate position opposite the legend 81 and the lever 33 will be moved to its lowermost position. This action further reduces the angle of the mercury tube 53 to the horizontal, in which case the solenoid 62 will be operated to close the valve 89 at a lower rate of vehicle deceleration, and again such rate of vehicle deceleration will be slightly less than can be accepted by the rear wheel brakes without locking or sliding.

If the highway is icy, the lever 34 will be moved to its uppermost position opposite the legend 80 and the lever 33 will be positioned according to the loading of the vehicle. Thus the mercury tube 53 will be arranged closer to a horizontal position, to be closed at a much lower rate of vehicle deceleration to minimize the chance of sliding on the icy highway.

In order that the operator may be kept reminded that the lever 34 is in a position at the upper end of the slot 78 for minimum rear wheel braking at predetermined low vehicle deceleration rates, the lifting of the lever 34 to its uppermost position will cause the boss 98 to engage the stem 97, thus closing the switch 96 and operating the signal light 101.

Initial adjustment of the mercury switch 52 is provided for by the connection of the clip 60 to the lever 38. The nut 61 may be loosened, the switch 52 rocked, and the nut 61 again tightened.

From the foregoing it will be apparent that the present device is extremely simple and that it is highly effective for cutting off increases in pressure in the rear wheel cyliders 23 at any given point according to the rate of vehicle deceleration determined by the setting of the levers 33 and 34. The device, therefore, constitutes an important safety mechanism for use with motor vehicle brake systems. The solenoid 62 and its valve 89 render practicable the closing off of the hydraulic line to the rear wheel cylinders 23. With the present device, the valve 89 would tend to remain closed by virtue of higher pressure in the chamber 87 than in the chamber 86. However, the spring 94 is designed to open the valve 89 against any pressure and accordingly will remain closed only so long as the solenoid 62 is energized. Accordingly it will be apparent that if the solenoid 62 has been energized and vehicle deceleration decreases, the switch 52 will open, and the spring 94 will open the valve 89 even though pressure beneath this valve is higher than in the chamber 86. The switch 52 may be quite accurately controlled by the proper positioning of the levers 33 and 34.

It is to be understood that the form of the invention shown and described is to be taken as a preferred example of the same, and that various changes in the shape, size, and arrangement of the parts may be made without departing from the spirit of the invention or the scope of the appended claims.

We claim:

1. In a switch mechanism, an inertia operated switch, a pair of manually operable levers respectively independently movable according to different conditions, and means connected between said levers and supporting said switch whereby, upon movement of either of said levers, the angle of inclination of said switch to the horizontal will be varied to change the inertia necessary to close said switch.

2. In a switch mechanism, an inertia operated switch, a pair of manually operable levers respectively independently movable according to different conditions, and an idler lever carrying said switch and arranged between and pivoted to the levers of said pair whereby movement of either lever of said pair will change the angle of inclination to the horizontal of said switch to change the inertia necessary to close said switch.

3. In a switch mechanism, an inertia operated switch, a pair of manually operable levers respectively independently movable according to different conditions, the levers of said pair being parallel to each other, and an idler lever by which said switch is carried and pivotally connected at one end to one lever of said pair, the other end of said idler lever having a slot, and a pivot pin carried by the other lever of said pair and operative in said slot whereby, in effect, said idler lever is pivoted at longitudinally spaced points to both levers of said pair so that movement of either lever of said pair tilts said idler lever to change the angle of inclination to the horizontal of said switch to change the inertia necessary to close said switch.

4. In a switch mechanism, an inertia operated switch, a casing having a wall provided with a pair of vertical slots, a pair of levers each projecting through one of said slots and pivotally supported for turning movement on a common horizontal axis remote from said slots, and an idler lever arranged between the levers of said pair and having pivotal connection at longitudinally spaced points with the levers of said pair for turning movement relative thereto on horizontal axes, said switch being carried by said idler lever intermediate its ends, movement of either lever on said common horizontal axis changing the inclination of said switch to the horizontal to change the inertia necessary to close said switch.

5. A switch mechanism according to claim 4 wherein said idler lever is provided with an intermediate portion parallel to the vertical planes of movement of the levers of said pair, a clip carrying said switch, and means for adjustably attaching said clip to said intermediate portion of said lever for adjusting the angle to the horizontal of said switch independently of movement of the levers of said pair.

6. A switch mechanism according to claim 4 wherein said casing is provided with side walls, a pivot rod extending between said side walls and on which said levers are pivotally mounted, and means frictionally engaging each lever of said pair whereby either of such levers will remain in any vertically adjusted position.

7. A switch mechanism according to claim 4 wherein said casing is provided with said walls, a pivot rod extending between said side walls and on which said levers are pivotally mounted, a friction washer arranged between the pivoted end of each lever of said pair and the adjacent casing side wall, and a compression spring surrounding said pivot rod and engaging both levers to maintain them in frictional engagement with the respective washers whereby either lever of said pair will remain in any vertically adjusted position.

8. In a switch mechanism, a mercury switch inclined from the horizontal, a pair of levers pivoted at one end for independent swinging movement in vertical planes according to different conditions, means connected between said levers and supporting said switch whereby the inclination of said switch to the horizontal will be changed upon movement of either lever of said pair to change the inertia necessary to close said switch.

9. In a switch mechanism, a mercury switch inclined to the horizontal, a pair of levers pivoted at one end for independent swinging movement in vertical planes, and an idler lever having pivotal connection at horizontally spaced points with both levers of said pair for turning movement relative to such levers on horizontal axes, said switch being carried by said idler lever for turning movement therewith whereby movement of either lever of said pair changes the angle of said switch to the horizontal to vary the inertia necessary to close said switch.

10. In a switch mechanism, a mercury switch inclined from the horizontal, a pair of levers pivoted at one end for independent swinging movement in vertical planes, an idler lever carrying said switch and having one end directly pivotally connected to one lever of said pair for turning movement on a horizontal axis, the other end of said idler lever being slotted, and a horizontal pivot pin carried by the other lever of said pair and engageable in said slot so that said idler lever has pivotal connection with both levers of said pair for turning movement on longitudinally spaced axes whereby the angle to the horizontal of said switch may be changed by movement of either lever of said pair to change the inertia necessary to close said switch.

References Cited in the file of this patent

UNITED STATES PATENTS

| | | |
|---|---|---|
| 2,182,463 | Beeston | Dec. 5, 1939 |
| 2,914,628 | Varner | Nov. 24, 1959 |
| 2,953,412 | Hill | Sept. 20, 1960 |
| 2,986,616 | Hansend | May 30, 1961 |
| 3,022,115 | Hill et al. | Feb. 20, 1962 |